UNITED STATES PATENT OFFICE.

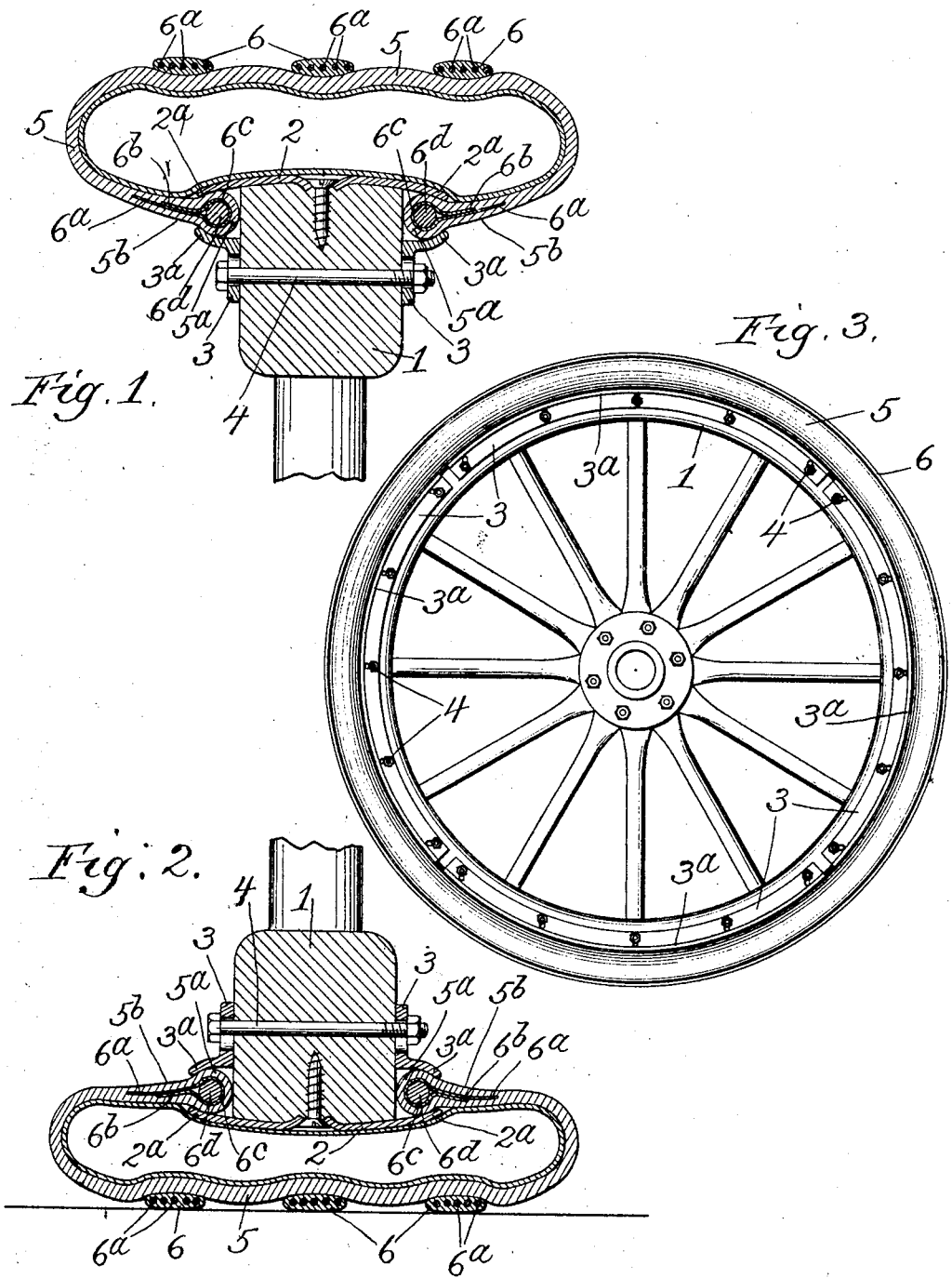

THOMAS B. JEFFERY, OF KENOSHA, WISCONSIN.

PNEUMATIC-TIRED WHEEL.

No. 803,345. Specification of Letters Patent. Patented Oct. 31, 1905.

Application filed November 21, 1904. Serial No. 233,697.

*To all whom it may concern:*

Be it known that I, THOMAS B. JEFFERY, a citizen of the United States, residing at Kenosha, in the county of Kenosha and State of Wisconsin, have invented new and useful Improvements in Pneumatic-Tired Wheels, of which the following is a specification, reference being had to the accompanying drawings, forming a part thereof.

The purpose of this invention is to provide a wheel having a pneumatic tire of suitable flexible construction less liable than previous constructions to be worn or cut off by the folding of the flexible casing of the tire over the edge of the wheel-rim or seat of the tire, which is liable to occur when the wheel is compressed under the load which the wheel carries; and in connection with this purpose and partly to assist this purpose it is the further purpose of this invention to provide an inflatable pneumatic tire which when inflated to the maximum tension for use is oblong rather than circular in cross-section, the greater diameter being transverse and the shorter diameter radial to the wheel.

It consists in the features of construction set out in the claims.

In the drawings, Figure 1 is a transverse section of a wheel-felly and tire thereon embodying the present invention, showing the tire fully inflated. Fig. 2 is a similar section showing the tire inflated, but compressed as when the wheel is carrying a load. Fig. 3 is a side elevation of a wheel-tire of the same construction.

In the drawings I have shown this invention applied to a wheel having a wooden felly 1, upon which there is secured a rim 2, entirely encompassing the wheel and overhanging the lateral margins of the felly 1 for the purpose of coöperating at the two sides of the felly with an annular tire-retaining device 3, which is preferably made in separate segments, as illustrated, each of which is in the drawings designated by the said identifying numeral 3. These annular devices at opposite sides of the felly 1 are conveniently bound thereto by bolts 4 4, taking through the felly and binding both the opposite devices 3. The rim 2 has its overhanging portion $2^a$ at each side curved back toward the axis of the wheel, and the annular retaining devices 3 have their flanges $3^a$ projecting off from the plane of the wheel and deflected away from the axis and hollowed or concaved on the outer side facing the inwardly-curved overhanging margins $2^a$ of the rim 2. There is thus formed at each side of the felly between the overhanging margins $2^a$ of the rim and the offjutting flange $3^a$ of the retainers a laterally-opening recess extending all around the wheel, which widens back from its mouth to the side of the felly, and is thereby adapted to seat and hold the enlarged or reinforced marginal portion $5^a$ of the flexible tire-casing 5. It will be understood that said enlarged or reinforced marginal portions will be first engaged under the overhanging flanges $2^a$ of the rim 2 before the retainers 3 are firmly secured in place, and while being only loosely attached they may be manipulated so as to open the mouth of the recesses sufficiently to admit said enlarged margins of the tire-casing. The reason for preferring to make these annular devices 3 in segments instead of each integral or as a complete closed-up ring is that thereby they may be fastened to the rim and conveniently held in place while susceptible of movement radially with respect to the wheel to open and close the mouth of the recesses, and for this purpose the holes for the bolts 4 are preferably slotted and elongated radially with respect to the wheel, so that the several segments can be moved in and out, as indicated. It will be understood that when both edges of the casing are suitably lodged in the recess the annular retainers 3 will be permanently bolted in place for holding said edges of the casing securely in the lateral recesses. The structure shown has the advantage of causing the tire fabric to be pressed against a gripping edge of the rim structure both interiorly and exteriorly, which increases its capacity for bearing the strain of inflation.

It is one purpose of this invention to afford a pneumatic tire which shall not be circular in cross-section when distended to maximum. The reason for this is that a tire normally circular in cross-section when inflated to the maximum is exposed to a back-and-forth hinge-like action at the sides by being alternately flattened and relieved from flattening at the tread under the weight of the load and is thus rapidly deteriorated along the sides, causing rupture to occur more frequently there than even at the tread, where the frictional wear is greatest; but if the tire at maximum inflation is oblong in cross-section not only is there afforded a broader tread-surface for traction on the pavement, but also the compression caused by the weight of the load only very slightly changes the contour at the sides, producing the hinge action mentioned to a negligible amount. For this purpose the tire-casing 5 has encompassing its tread portion one or more (as illustrated, three) substantially non-extensible bands 6 6 6. These are preferably made of rubber-embedded braids or cords 6ᵃ of such firm material as to practically be non-extensible under the maximum tension to which the tire is designed to be inflated, or at least so as to reach the limit of their extensibility while the tire is still flat or oblong in cross-section, as shown in Fig. 1, the entire circumferential length of these restraining-bands 6 being considerably less than would be necessary to encompass, circumferentially with respect to the wheel, the tire if it were inflated to circular form in cross-section. When thus restrained against inflation beyond the flattened form, (shown in Fig. 1,) the lateral portions of the tire-casing, it will be seen, are not folded or drawn up around the lateral edges of the rim 2, but extend off from the edge of the latter in substantially the direction in which the marginal portion of said tire extends, and this marginal portion is preferably slightly curved upward, so as to be convex on the under side, against which the tire-casing rests when the tire is inflated, so that said casing may extend off tangentially with respect to said convexly-curved margin of the rim. The restraining-bands 6 6 6 therefore prevent the tire from being folded sharply over the flanges 2ᵃ of the rim. To similarly prevent them from being folded sharply or abruptly over the edges of the retainers 3 when the tire is compressed by the load which the wheel carries, the marginal portions of the casing for some distance inward from the reinforced and enlarged portions 5ᵃ are reinforced for stiffness. These stiffened and reinforced portions are indicated at 5ᵇ on the drawings, and the area of such reinforcement may be varied considerably, but should extend nearly to the point for an inch or more inward from the enlarged or thickened marginal portions 5ᵃ. The thickness or stiffness or both the thickness and stiffness of these marginal portions 5ᵇ diminishes gradually from the enlarged and reinforced portions 5ᵃ for the distance mentioned, so that upon any tension operating to curve or fold the tire-casing at such reinforced or stiffened portions 5ᵇ the curvature will increase gradually in the direction in which the thickness or stiffness diminishes, and this will be true whichever way the stress to which the casing is exposed tends to curve this marginal portion thereof. It will happen, therefore, that when the tire is under inflation without carrying a load, so that the tendency would be to curve the stiffened portion concavely outward, as seen in Fig. 1, such outwardly-concave curvature will be so gradual that even without the restraint afforded by the restraining-band 6 there will be no sharp or abrupt folding of the casing 5 over the edge of the marginal flanges 2ᵃ of the rim 2, and when the tire inflated is subjected to load, so as to tend to curve the casing back over the retainers 3, a similar gradual increase of curvature will be caused, as represented in Fig. 2, with the like effect of preventing any abrupt folding or lapping of the casing over the edge of the retaining device 3.

A convenient method for graduating the reinforcement or stiffening of the marginal portion 5ᵇ of the casing consists in embedding in the casing at this part a double fold of canvas-web 6ᶜ, which may be folded over a firmly braided or twisted cord or wire 6ᵈ in the marginal portion 5ᵃ, one lap or layer of such webbing being wider than the other and extending beyond it, and the entire marginal portion, including both 6ᵃ and 6ᵇ, being thickened as to the rubber in which both the cord and the web are embedded, diminishing in respect to the thickness from the edge toward the middle of the casing.

I do not limit myself to the specific construction herein shown either for the means of forming the lateral recesses on the felly for receiving the enlarged or reinforced margins of the casing nor as to means for so enlarging and reinforcing said margins nor as to means for restraining the tire at the tread to prevent its inflation beyond a flattened form in cross-section, as shown, and for each of these specific means shown any mechanic familiar with the art will readily be able to substitute other more or less completely equivalent means and devices which will be within the scope of my invention as to these features respectively.

I claim—

1. In a vehicle-wheel, in combination with the felly having a peripheral rim overhanging at the sides, a flexible tire-casing having beads or enlargements at its lateral edges, such beads or enlargements being engaged under or within the overhanging margins of the rim, and guards adjustably secured to the felly within the circle of such beaded edges adapted to be adjusted bodily radially with respect to the wheel for holding the edges outward against the overhanging margins of the rim.

2. In a vehicle-wheel, in combination with the felly having laterally-projecting flanges at the outer circumference, a tire-casing having beads or enlargements at its lateral edges engaged under or within the laterally-projecting flanges, and segmentally-divided annular guards secured to the felly at the opposite sides thereof within the circles of such beaded edges respectively, adapted to be adjusted radially with respect to the wheel for holding said edges against the marginal flanges of the felly.

3. In a vehicle-wheel, a flexible tire-casing having its lateral edges approximately as long as its middle, whereby it may be normally nearly flat transversely when outspread, and having reinforcements at the middle part of its width which forms the tread when the tire is inflated, such reinforcements being non-extensible circumferentially with respect to the wheel.

4. In a vehicle-wheel, in combination with the felly, a tire-casing secured thereto at its lateral edges; non-extensible bands formed in a unitary manner with the tire-casing and encompassing the same circumferentially with respect to the wheel at the portion of said casing constituting the tread, said encompassing bands being too short to permit the expansion or inflation of the casing beyond a degree at which it is flat or oblong in cross-section, the marginal portions of the casing being reinforced and stiffened to limit their transverse flexibility.

5. In a vehicle-wheel, in combination with the felly, a tire-casing secured thereto at its lateral edges; non-extensible bands formed in a unitary manner with the tire-casing and encompassing the same circumferentially with respect to the wheel at the portion of said casing constituting the tread, said encompassing bands being too short to permit the expansion or inflation of the casing beyond the degree at which it is flat or oblong in cross-section, the marginal portions of the casing being reinforced and stiffened to limit their transverse flexibility, such reinforcement and stiffness diminishing gradually from the engagement of the casing at its margins with the rim for a limited distance toward the middle of the width of the casing.

In testimony whereof I have hereunto set my hand, in the presence of two witnesses, at Chicago, Illinois, this 22d day of October, A. D. 1904.

THOS. B. JEFFERY.

In presence of—
FREDK. G. FISCHER,
M. G. ADY.